Dec. 27, 1960 F. W. SAMPSON 2,966,239
BRAKE STRUCTURE
Filed July 22, 1957

INVENTOR.
Frederick W. Sampson
BY
His Attorney

United States Patent Office 2,966,239
Patented Dec. 27, 1960

2,966,239
BRAKE STRUCTURE

Frederick W. Sampson, Dayton, Ohio, assignor to General Motors Corporation, Detroit, Mich., a corporation of Delaware Filed July 22, 1957, Ser. No. 673,421
3 Claims. (Cl. 188—78)

This invention relates to brakes and parts thereof and is particularly concerned with brush means for improving the operation of vehicle brakes.

It is an object of the invention to provide brush means for a brake which will constantly remove dust and abrasive particles in contact with the brake lining whereby the operation of the brake is improved and the life of the lining is lengthened.

In carrying out this object, it is a further object to provide a resiliently biased strip which rides on the brake drum at the lower portion thereof and which blocks the progress of foreign particles and causes said particles to be ejected from between the brake lining and the brake drum.

Another object of the invention is to provide a scraper which is fastened to the lower portion of a brake assembly and which is resiliently urged against the surface of the brake drum whereby foreign particles are removed that would otherwise be present between the brake drum and the brake lining.

Further objects and advantages of the present invention will be apparent from the following description, reference being had to the accompanying drawings wherein preferred embodiments of the present invention are clearly shown.

In copending applications, Serial Nos. 540,842, 541,054, now abandoned, and 623,135, now Patent No. 2,910,145, assigned to the assignee of the present invention, ferrous brake lining materials are disclosed as well as specific structures of expanding type brakes. These structures are directed to specific designs for use in connection with metallic linings although it is understood that the present invention is applicable to nonmetallic linings and combinations of any of the above.

In the use of metallic linings, there is a tendency for particles of the metallic lining to abrade from the surface thereof and, due to gravity, migrate to the bottom of the brake drum where they are held to accumulate during use of the brake. Some of this accumulation of foreign particles tend to distribute due to centrifugal force upon rotation of the brake drum while the remainder thereof moves about at the bottom portion of the drum and tends to climb up the sides of the drum on the braking surfaces thereof. These foreign particles are therefore present on the braking surface when the brake band is in the released position. When the operator of the vehicles desires to use the brakes and the brake bands are expanded into contact with the brake drum, these foreign particles come between the band and the drum and tend to abrade either the band or the drum or both and, in all instances, cause undesirable noise.

It is highly desirable to eliminate these foreign particles as quickly as they are produced within the brake drum and it is for this end that the present invention is directed. It is understood that similar accumulations may occur when using nonmetallic linings or semimetallic linings and while the condition is not acute as when using metallic linings, the use of the brush as herein disclosed will improve the operation of the brakes under all circumstances.

Figure 1:
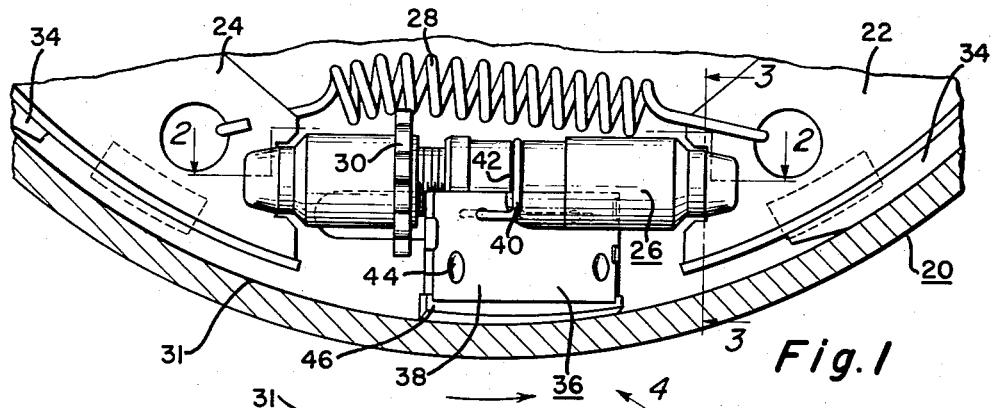
Figure 1 is a partial view of an expanding type brake within a brake drum.
Figure 2:
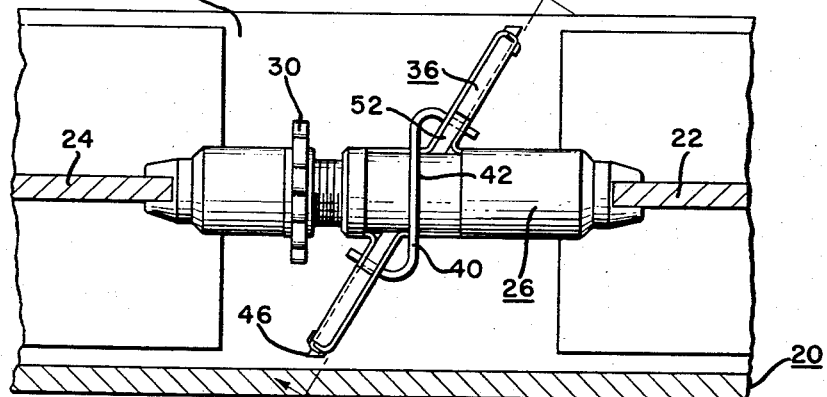
Figure 2 is a top view of adjusting mechanism used in connection with the brake band showing the pivot nut adjustment with the scraper in place.
Figure 3:
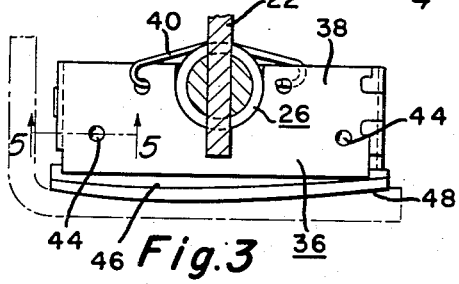
Figure 3 is a section taken on line 3—3 of Figure 1.

Specifically referring to the drawings, Figure 1 shows the lower portion of an expanding type brake with the cover plate removed. In this brake 20, two brake bands 22 and 24 generally hinged or associated at their upper ends with an expanding means are held in spaced relation by a pivot nut assembly 26 and a tension spring 28. The pivot nut assembly 26, by manipulation of the adjustment nut 30, can be used to force the bands into closer proximity to a drum 31 or move them away from the drum so that the brakes may be suitably adjusted. Interposed between the bands 22 and 24 and the drum 31 are brake linings 34 which may be metallic pads or other material having a high coefficient of friction which can be used to frictionally engage the drum and act as a braking means. The linings 34 are either welded, riveted or otherwise suitably secured to the bands and are nonrotative with respect thereto.

The scraper which forms the basis of the present invention is shown at 36 in Figure 1 and includes a sheet metal casing member 38 which comprises two identical parts in reversed position held together by tangs to form a sleeve-like member. The member 38 is held to the pivot adjustment by a retaining spring 40 which passes through apertures in the sheet metal casing member 38 and holds the member at an angle of about 40° to the axis of the direction of rotation. The retaining spring 40 is preferably positioned by means of a groove 42 in a portion of the pivot nut adjustment to prevent longitudinal movement of the casing relative thereto. The casing member is dimpled as at 44 on opposite sides thereof which dimples act as positioning means for the brush to be described hereinafter.

Figure 4:
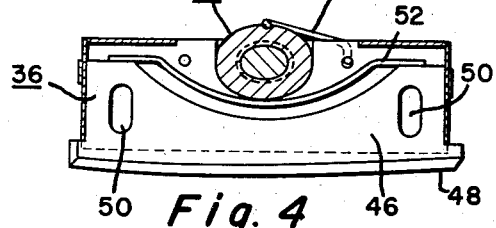
Figure 4 is a partial section taken on line 4—4 of Figure 2 with the front plate of the brush holder removed.
Figure 5:
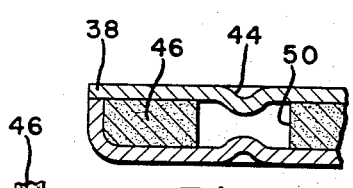
Figure 5 is a section taken on line 5—5 of Figure 3.
Figure 6:
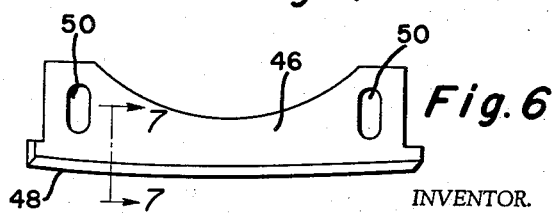
Figure 6 is a plan view of the brush used in the assembly.
Figure 7:
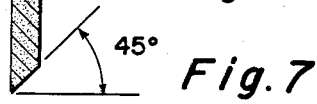
Figure 7 is a sectional view taken on line 7—7 of Figure 6.

The brush itself is shown at 46 in Figure 4 wherein one of the portions of the casing member 38 have been removed. The brush has a curved scraping edge 48 so as to ride in coextensive relationship to the surface of the drum which edge is preferably angled at about 45° as shown in Figure 7. This yields a small surface area which quickly wears in to form a uniform smooth riding brush. The brush is apertured at opposite sides thereof at 50 which apertures receive the dimples 44 on opposite sides of the casing so that the brush is limited in its movement within the casing whereby the assembly is maintained even when the brush assembly is removed from the brake.

In order to resiliently urge the brush downwardly and into contact with the brake drum 31, a generally arcuate leaf spring 52 is used which rests on top of the brush and which is urged downwardly by engagement after assembly with a portion of the pivot nut adjustment as shown in Figure 4. This leaf spring 52 always maintains the brush in resilient contact with the drum.

The brush 46 is preferably made from carbon, porous metal impregnated with babbitt or some other material which does not have high frictional characteristics with respect to the brake drum. The specific material in the brush is of no great importance providing that it will rub silently on the brake drum and will be sufficiently rugged to withstand use in the brake.

In operation, the brush drags on the lower portion of the brake drum at all times and is angled outwardly so that any accumulation of particles of foreign material which are gravitated to the lower portion of the brake drum will be scraped to the edge thereof whereupon they will fall out between the cover plate and the drum and thereby relieve the brake of any abrasive action which might otherwise have occurred. As previously stated, the removal of this foreign material also makes the operation of the brake considerably quieter and improves the life of the linings.

It is apparent that the brush as shown herein may be quickly assembled or disassembled to the brake unit through the assembly or disassembly of the retaining spring 40 which is merely passed through apertures in the brush housing member 38. Furthermore, this spring acts to resiliently maintain the brush in position so that any misalignment thereof will not tend to gall the surface of the drum but will resiliently adjust the position of the brush to its best operational position. Once the brush is in position and has been used for a short period of time, the bevel edge of the brush will wear into place so as to provide maximum efficiency in the removal of foreign particles. As previously stated, replacement of the brush can be easily accomplished through manipulation of the retaining spring which permits easy removal of the brush assembly whereupon a new brush assembly may be put in place and quickly attached to the brake.

While the forms of embodiment of the present invention as herein disclosed constitute preferred forms, it is to be understood that other forms might be adopted.

What is claimed is as follows:

1. A brake, comprising in combination; an expandable brake assembly including a pair of brake shoes having linings thereon, a rotatable brake drum closed on one side thereof surrounding said expandable assembly, means for adjusting said expandable assembly positioned adjacent the lower side of the assembly, when it is vertically positioned, and between said brake shoes, a brush-holder removably mounted on said means and positioned at an angle in the order of from 40° to 50° to the plane of rotation of the brake drum, a brush made from a material having a lower coefficient of friction than the coefficient of friction of the brake drum and carried by the said holder and adapted to move therein into engagement with said drum, said holder and brush being positioned with respect to the drum at an angle so as to cause foreign particles on the drum to be scraped by said brush away from the closed side of the drum and toward the open side thereof, and spring means associated with the holder for resiliently urging the brush into sliding engagement with the drum whereby the brush rides against the drum and continuously removes foreign particles therefrom.

2. The brake assembly claimed in claim 1 wherein the brush is made of graphite.

3. The brake assembly claimed in claim 1 wherein the brush is made of porous metal impregnated with babbitt metal.

References Cited in the file of this patent
UNITED STATES PATENTS

| | | |
|---|---|---|
| 1,844,461 | Chase | Feb. 9, 1932 |
| 1,853,963 | Dick | Apr. 12, 1932 |
| 1,919,343 | Payne | July 25, 1933 |
| 2,051,967 | Saito et al. | Aug. 25, 1936 |